United States Patent [19]

Horikawa

[11] Patent Number: 4,559,645
[45] Date of Patent: Dec. 17, 1985

[54] IMAGE INFORMATION PROCESSING DEVICE

[75] Inventor: Yoshiaki Horikawa, Hachiouji, Japan

[73] Assignee: Olympus Optical Co., Ltd., Tokyo, Japan

[21] Appl. No.: 436,361

[22] Filed: Oct. 25, 1982

[51] Int. Cl.$^4$ .............................................. G06K 9/58
[52] U.S. Cl. ...................................... 382/65; 358/138; 358/213; 358/227; 382/58
[58] Field of Search ............... 358/213, 138, 226, 227; 382/68, 58, 65

[56] References Cited

U.S. PATENT DOCUMENTS

| | | | |
|---|---|---|---|
| 2,838,600 | 6/1958 | Salinger | 358/227 |
| 4,064,533 | 12/1977 | Lampe et al. | 358/213 |
| 4,167,755 | 9/1979 | Nagumo | 358/213 |
| 4,189,751 | 2/1980 | Nagumo | 358/213 |
| 4,244,029 | 1/1981 | Hogan et al. | 382/42 |

FOREIGN PATENT DOCUMENTS 3007620 9/1981 Fed. Rep. of Germany .
54-149419 11/1979 Japan .

Primary Examiner—Leo H. Boudreau
Assistant Examiner—Joseph Mancuso
Attorney, Agent, or Firm—Cushman, Darby & Cushman

[57] ABSTRACT

An image information processing device comprising a sample holding circuit which can hold only required image data, an image information processing circuit and a central operation circuit in order that various problems relating to timing for removing unnecessary images may be eliminated and the number of memories may be comparatively small. This image information processing device is applied to a focusing device.

2 Claims, 17 Drawing Figures

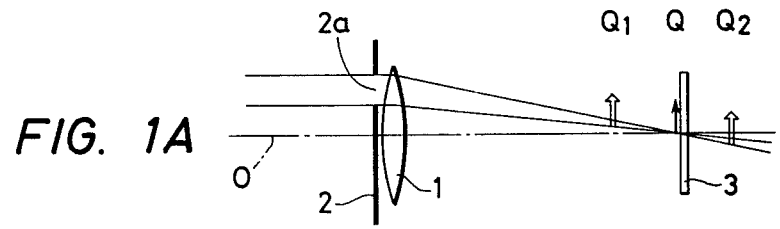
FIG. 1A
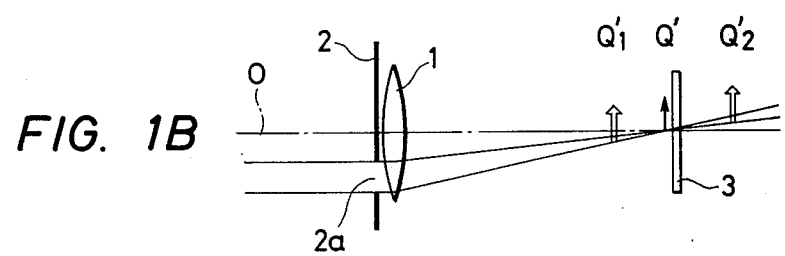
FIG. 1B
FIG. 3
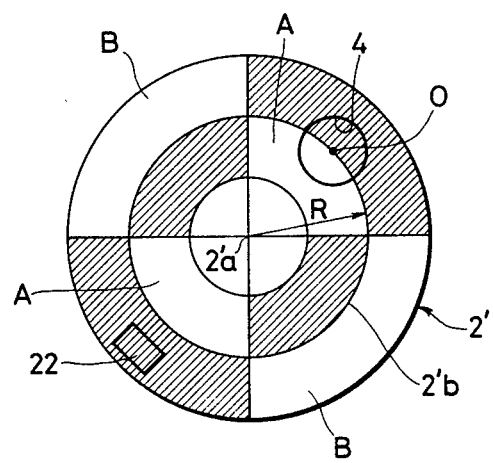

IMAGE

OUTPUT OF LIGHT RECEIVING ELEMENT

PULSE I

PULSE II

START PULSE

CLOCK PULSE

SAMPLE HOLDING PULSE

IMAGE INFORMATION PROCESSING DEVICE

BACKGROUND OF THE INVENTION (a) Field of the Invention

The present invention relates to an image information processing device, and particularly to an image signal selecting device adapted to remove unnecessary image signals stored during a transition and to supply only necessary image signals to a signal processing system, in the case of picking up the image of an object having a substantially stationary state and a transitionary state with a storage type image pickup device.

(b) Description of the Prior Art

Various kinds of image pickup tube or solid state image pickup devices used as an image pickup device exist in which an electric signal of a size proportional to the amount of light incident upon the light receiving surface of the image pickup device for a fixed time (a storage time) is issued as an output signal. When the light intensity distribution of an object image is converted into an electric signal by means of this kind of image pickup device, if the position of the object image is changed on the light receiving surface within the storage time, the output signal will be issued in accordance with a light intensity distribution formed by two overlapping independent light intensity distributions and therefore, the image signal will not present a correct object image.

In order to obtain a correct image signal by picking up an object image which repeats a substantially stationary state and a fluctuant state on the light receiving surface of the image pickup device, it is necessary to use only the output signal stored in the image pickup device during the substantially stationary state without picking up the output signal including therein such fluctuant state as the shift of the image position or the like.

In a device processing an image signal by using a signal processing device such as a micro-computer or the like, it is possible to take all output signals from the image pickup device into the signal processing device and to perform a selection as to whether the signal taken in should be picked up or not, by means of software, in the signal processing device. However, if the above mentioned processing method is used, there is a disadvantage that many memories are required to momentarily store the output signals from the image pickup device. To the contrary, it is possible to arrange the software so as to take only necessary image signals into the signal processing device. In this case, however, the operation for making the change of image, picking-up of image and taking-into of signals must synchronize. That is, a timing operation must be performed by means of software. This will complicate the software program.

SUMMARY OF THE INVENTION

In view of the above mentioned circumstances, a primary object of the present invention is to provide an image signal selecting device to be arranged between an image pickup device and signal processing device to remove the unnecessary signal from the output signal of the image pickup device and to supply only the necessary signal to the signal processing device.

Another object of the present invention is to arrange so that the supply of the above mentioned necessary signal may be performed without requiring any software for performing a timing between the input operation to the signal processing device and the image pickup operation of the image pickup device.

These and other objects will become more apparent during the course of the following detailed description and appended claims.

BRIEF DESCRIPTION OF THE DRAWINGS

FIGS. 1A and 1B are views showing a basic optical system of a focusing device to which an image information processing device according to the present invention is to be applied;

FIG. 3 is an elevational view of a light interrupting plate;

DESCRIPTION OF THE PREFERRED EMBODIMENT

Figure 2:
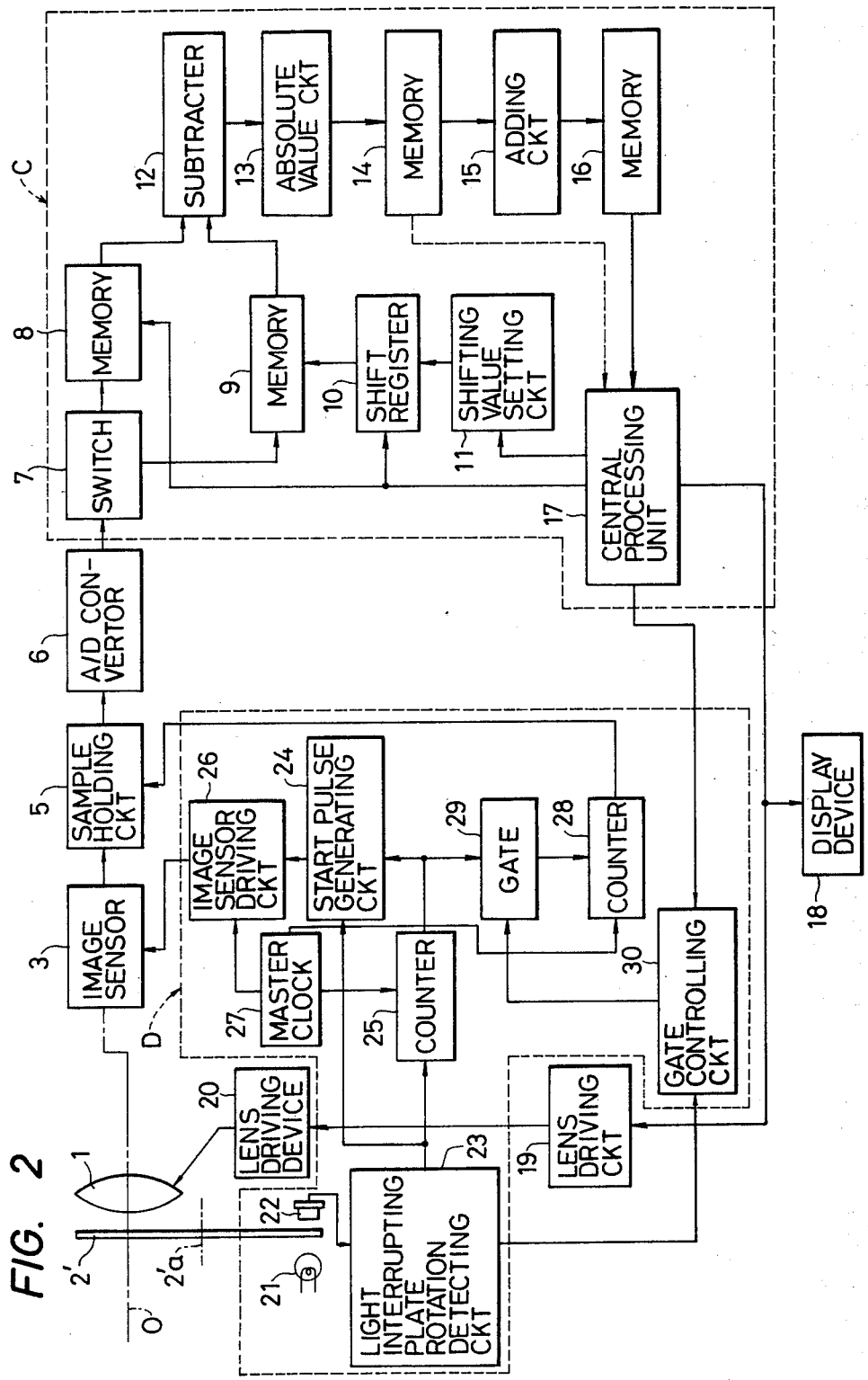
FIG. 2 is a block diagram of electric circuits of an embodiment of an image information processing device according to the present invention.

FIGS. 1A and 1B show a basic optical system of a focusing device to which the present device is to be applied. In FIGS. 1A and 1B, the reference numeral 1 denotes an image forming lens, 2 denotes a light interrupting plate arranged rotatably around an optical axis O at or near the position of a pupil of the lens 1 and provided with an aperture 2a positioned inside the pupil, and 3 denotes such image sensor as a solid image pickup device provided in the focus position. Therefore, in the focused state, an object image Q will be formed on the image sensor 3 as shown in FIG. 1A when the aperture 2a is positioned above, and an object image Q' will be formed on the image sensor 3 as shown in FIG. 1B when the aperture 2a is positioned below. As is apparent from FIGS. 1A and 1B, Q and Q' will be formed in exactly the same position in the direction vertical to the optical axis O, in the unfocused state, that is, at the time of front the object image will be formed in the position other than on the focal surface, that is, other than on the image sensor 3 as shown with reference symbols $Q_1$, $Q_2$ and $Q_1'$, $Q_2'$ in FIGS. 1A and 1B. Therefore, on the image sensor 3, an unclear image $Q_1$, $Q_2$, $Q_1'$ or $Q_2'$ will be formed in a position deviated respectively to the other side in the direction vertical to the optical axis O from the image Q. Therefore, if the light interrupting plate 2 is rotated in the unfocused state, the image position will move as $Q_1 \rightarrow Q_1'$ or $Q_2 \rightarrow Q_2'$. Therefore, if the image position is so adjusted as not to move even if the light interrupting plate 2 is rotated, the lens 1 will be rightly focused. The respective moving directions of the images $Q_1$ and $Q_2$ in the case of the front focusing and rear focusing are different from each other. Therefore, if the moving direction is detected, it will be possible to judge whether the front focusing or rear focusing is made. Further, the amount of deviation of focusing can be computed from the amount of deviation of the image $Q_1$ or $Q_2$ and therefore focusing can be made by one operation.

FIG. 2 shows a block diagram of electric circuits of an embodiment of the present image information processing device. The reference numeral 2' denotes a light interrupting plate arranged rotatably around an axis 2a' parallel with the optical axis O. As shown in FIG. 3, the light interrupting plate 2' has a dividing line 2b' consisting of the periphery of a radius R coinciding with the center of a pupil 4 of the lens 1, that is, the optical axis O has the parts inside and outside the dividing line 2b' formed to be transparent alternately at intervals of a rotation angle of 90 degrees. As is apparent from this description, the plate 2' has the same function as of the light interrupting plate 2 shown in FIG. 1. The reference numeral 3 denotes an image sensor, for example, of 512 bits, 5 denotes a sample holding circuit and 6 denotes an analogue-digital (A/D) converting circuit. The reference numeral 7 denotes a switch, 8 and 9 denotes memories, 10 denotes a shift register, 11 denotes a shifting value setting circuit, 12 denotes a subtracter, 13 denotes an absolute value circuit, 14 denotes a memory, 15 denotes an adding circuit, 16 denotes a memory and 17 denotes a central processing unit and they form a central operation circuit C. The reference numeral 18 denotes a display device, 19 denotes a lens driving circuit and 20 denotes a lens driving device. The reference numeral 21 denotes a light source, 22 denotes a light receiving element arranged on the side opposed to the light source 21 with respect to the light interrupting plate 2', 23 denotes a light interrupting plate rotation detecting circuit, 24 denotes a start pulse generating circuit, 25 denotes a counter, 26 denotes an image sensor driving circuit, 27 denotes a master clock, 28 denotes a counter, 29 denotes a gate and 30 denotes a gate controlling circuit and they form an image information processing circuit D.

Figure 4A:
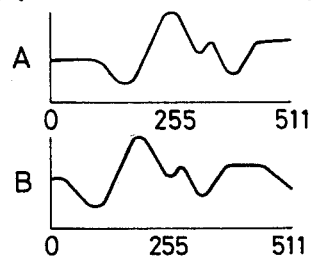
FIGS. 4A, 4B, 4C and 4D show graphs showing light intensity distributions and correlations on image sensors.

The image information processing device is formed as described above. First, the operation of the central operation circuit C shall be described. In the first state, that is, the state in which a light bundle passes through the transparent parts A (See FIG. 3) of the light interrupting plate 2', if the image formed by the light bundle is received by the image sensor 3, the light intensity distribution of the image will be converted to a photoelectric signal corresponding to it. This photoelectric signal will be held in the sample holding circuit 5, then will be converted to a digital signal in the analogue-digital converting circuit 6 and will be stored in the memory 8 through the switch 7. Here the memory 8 is generally called 512 locations of 8-1, ..., 8-512. That is to say, in this embodiment, 512 photoelectric outputs by the image sensor 3 will be obtained, will be therefore analogue-digital converted in turn and will be stored in turn as fA(1), ---, fA(512) in the memories 8-1, ..., 8-512. By the way, they need not be analogue-digital converted in turn but the photoelectric signals may be analogue-digital converted simultaneously. Then, the light interrupting plate 2' is rotated to be moved to the second state, that is, the state in which the light bundle passes through the transparent parts B (See FIG. 3), the light intensity distribution of the image formed by the light bundle is memorized through the image sensor 3, sample holding circuit 5, analogue-digital converting circuit 6 and switch 7 the same as is mentioned above. At this time, if the switch 7 is switched to the memory 9 side, the analogue-digital converted photoelectric signal will be stored as fB(1), ---, fB(512) in the memories 9-1, ---, 9-512. At this time, the light intensity distribution of the memorized image will be, for example, as shown in FIG. 4A. As the light intensity distributions in case the light passes through the transparent parts A and B are displaced from each other, it will be found that focusing is not made.

Figure 4B:
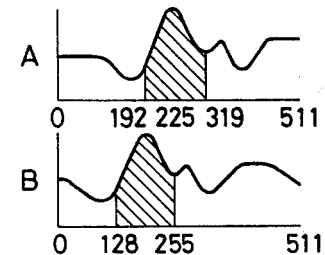
Figure 4C:
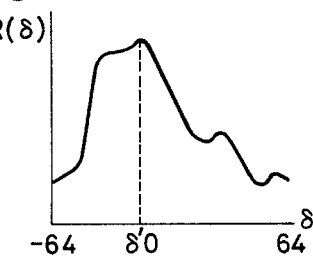

Then, the displacement of the image in case the light passes through the transparent parts A and B is computed by using the correlation. For example, by noting 128 bits (in FIG. 4B) of 512 bits, the correlation of fA(n) and fB(n) of the image in case the light passes through the transparent parts A and B is computed. For example, if the image in case the light passes through the transparent parts A is fixed at 192 to 319 bits and the image in case the light passes through the transparent parts B is displaced as in 128 to 255 bits, 129 to 256 bits, 130 to 257 bits, ---, 255 to 382 bits and 256 to 383 bits and the correlation is computed, the amount of deviation from the focus position and the direction of the deviation will be found from the displacement of the image in case the light passes through the transparent parts B when the value of the correlation becomes a peak. In the light of FIG. 4B, the concrete example of the computing formula is considered to be $$R(\delta) = \sum_{x=192}^{319} fA(x)fB(x + \delta) \quad (1)$$

or $$R(\delta) = \sum_{x=192}^{319} ABS\{fA(x) - fB(x + \delta)\} \quad (2)$$

wherein $\delta = -64$ to $\delta = 64$ are computed and ABS is an absolute value. $\delta'$ at which $R(\delta)$ takes the peak (the maximum value in the case of the formula (1) or the minimum value in the case of the formula (2)) will be the displacement of the image (FIG. 4C).

This shall be explained in detail by exemplifying the case of using the above mentioned formula (2) on the basis of the central operation circuit C. First, a address number designating signal is issued from the central processing unit 17 and the data stored in the address number x=192, that is, in the memory 8-192 are taken into the subtracter 12. On the other hand, this address number designating signal will be put also into the shift register 10 and will be shifted here by a predetermined value of $\delta$ (−64 here) by the shifting value setting circuit 11 to designate the address number of the memory 9. Therefore, the contents of the memory 9-128 will be taken into the subtracter 12 in which the difference between both data, that is, fA(129)-fB(128) will be computed. This value will be sent to the absolute value circuit 13, will be converted to an absolute value and will be stored in the memory 14. When the signal that it has been stored is put into the central processing unit 17, the address number designating signals of the memories 8 and 9 will be shifted by the central processing unit 17 on the basis of the signal and |fA(x)-fB(x+$\delta$)| corresponding to x=193 will be computed the same as is mentioned above and will be stored in the memory 14. Thereafter, in the same manner, that until x=319 will be repeated and stored in the memory 14. At this time point, all the contents of the memory 14 will be taken into the adding circuit 15 and $$R(-64) = \sum_{x=192}^{319} ABS\{fA(x) - fB(x - 64)\}$$

will be computed and will be kept stored in the memory 16-1. Then, by the instruction from the central processing unit 17, $\delta$ will be set at $-63$, x will be varied again to $x=192$ to 319 and $R(-63)$ will be computed the same as is mentioned above and will be stored in the memory 16-2. Thereafter, in the same manner, those until R(64) will be computed in turn and will be stored in the memory 16.

Figure 4D:
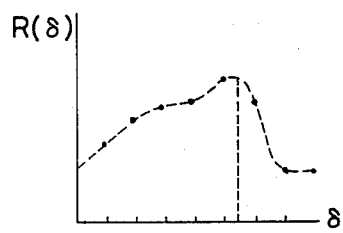

When the above is completed, the contents of the memories 16-1 to 16-129, that is, $R(-64)$-$R(64)$ will be taken into the central processing unit 17 and will be compared. If the minimum value $R(\delta_0)$ is detected, it will be found that the displacement of the image in the first state and in the second state is $\delta_0$. Therefore, as shown in FIG. 4C, the displacement can be judged by the size of this $\delta'0$ and the displacing direction of the image (whether the image is displaced in front or rear of the normal focus position) can be judged by the kind of sign. Therefore, if these signals are put into the lens driving circuit 19 and the lens 1 is moved by the lens driving device 20, automatic focusing will be able to be made. Further, it is needless to say that the above mentioned signals may be displayed by the display device 18 and focusing may be manually made on the basis of the display. By the way, the above mentioned $\delta$ corresponds to the individual bits in the image sensor 3. As $R(\delta)$ is computed, if a proper curved fitting or the like is made, a finer value of $\delta$ will be able to be obtained (See FIG. 4D), that is to say, the displacement of the image will be able to be detected to be finer than the pitch distance of the image sensor.

Figure 5A:
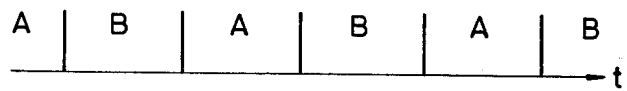
FIGS. 5A, 5B, 5C, 5D, 5E, 5F and 5G show time charts.
Figure 5B:
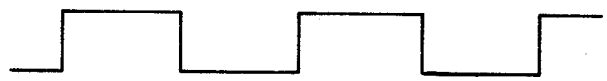
Figure 5C:
Figure 5D:
Figure 5E:
Figure 5F:
Figure 5G:
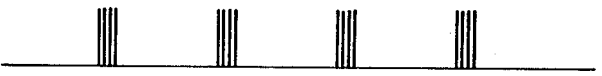

Now, the principle of automatically removing the unnecessary images among the images picked up by the image sensor 3, that is, the overlapping images produced when either one of the above mentioned first and second states shifts to the other shall be explained on the basis of the image information processing circuit D. FIGS. 5A to 5G are of time charts. FIG. 5A shows variations of an image. First of all, as the light receiving element 22 is set in such position as is shown in FIG. 3 with respect to the light interrupting plate 2', the light amount received by the light receiving element 22 by the rotation of the light interrupting plate 2' will vary as in FIG. 5B with the time. On the basis of the output of this light receiving element 22, the light interrupting plate rotation detecting circuit 23 will produce two kinds of pulses of pulses I generated whenever the brightness and darkness vary and pulses II whenever the darkness varies to the brightness as shown in FIGS. 5C and 5D. Then, the pulses I will be simultaneously put into the start pulse generating circuit 24 and the counter 25. In this case, the start pulse generating circuit 24 will generate such start pulses as are shown in FIG. 5E by the input of these pulses I and will put them into the image sensor driving circuit 26. On the basis of this input signal, the driving circuit 26 will drive the image sensor 3 with clock pulses (See FIG. 5F) generated by the master clock 27, will read out in turn the photoelectric outputs stored in the image sensor 3 and will transfer them to the sample holding circuit 5. However, this sample holding circuit 5 will hold the data transferred only when the later described sample holding pulses (See FIG. 5G) are put in but will not hold the data and abandon them in the other cases. However, these are photoelectric signals stored when the first state varies to the second state and are not necessary. On the other hand, the counter 25 will count the clock pulses of the master clock 27 by the input of the pulses I only for a predetermined image storing time and will put out a signal when the master clock pulses reach a predetermined number (at least 512 in this example). This signal will be simultaneously put into the start pulse generating circuit 24 and counter 28. As the start pulse generating circuit 24 operates the same as when signals are received from the detecting circuit 23, thereafter, as described above, the data from the image sensor 3 will be transferred in turn to the sample holding circuit 5. On the other hand, the counter 28 will begin to count the master clock pulses by the signal of the counter 25 and will send the sample holding pulses to the sample holding circuit 5 for each count. As the timings of the feed of these sample holding pulses and the feed of the data from the image sensor 3 just coincide with each other, all the data from the image sensor 3 will be held in the sample holding circuit 5. The count number of this counter 28 is the same as the image number of the image sensor 3 and is 512 in this embodiment. The data held in the sample holding circuit 5 will be converted to digital signals in the analogue-digital converting circuit 6 and will be taken into the central processing unit 17 to be used for the later processing by the above described principle. Then, when the pulse I emits from the detecting circuit 23, the start pulse generating circuit 24 will again operate and then the data will be taken into the central processing unit 17 the same as is mentioned above. As evident from the above, in this formation, the data obtained just after the detecting circuit 23 operates will be abandoned and the next obtained data will be held. Therefore, the photoelectric output obtained from the image sensor 3 just after the detecting circuit 23 operates, that is, the image signal stored when the transparent parts of the light interrupting plate 2' vary from A to B or from B to A will have two images mixed in, will not be adapted to focusing detection and will be therefore abandoned. On the other hand, the image signal beginning the image storage when the pulse I emits and ending the image storage after a predetermined time which has been counted by the counter 25 is an image signal which is obtainable only in the state that the light is passing through the transparent parts A or the state that the light is passing through the transparent parts B. Therefore, the image signal will be adapted to focusing detection and will be kept without being abandoned. Thus, only the necessary image informations can be kept.

By the way, in this embodiment, unless the information of a pair of lights which pass through the transparent parts A and B is used, no focusing detection will be able to be made. (In order to detect the displacement of the image, two informations of images will be required.) It is not good and must be avoided that the image information will be automatically sent in even when no image information is required in the central processing unit 17. Therefore, the above mentioned pulses II are used. That is to say, when a read-in signal from the central processing unit 17 is put into the gate controlling circuit 30 and then the pulses II are put in from the detecting device 23, an output will be put out to switch and keep the gate 29 on. Therefore, in this state, the operation from the generation of the start pulses to the generation of the sample holding pulses will be made as mentioned above and the image information will come to be sent in turn into the central processing unit 17 in the order of the transparent parts B, A, B, A, - - - . On the other hand, in case the image information becomes unnecessary in the central processing unit 17, when a signal is sent to the gate controlling circuit 30 from the central processing unit 17, the gate controlling circuit 30 will switch and keep the gate 29 off when the pulses II are put in.

Therefore, in this state, no sample holding pulse will be sent out to the sample holding circuit 5 and any data will no longer come into the central processing unit 17. If made as in the above, the input of the image informations will always end in the order of the transparent parts B, A, - - -, B, A, the image informations in the case of the transparent parts B and A will always come in turn by the same number into the central processing unit 17. Therefore, when the image informations of the states of the transparent parts B and A are used as paired, focusing detection will be possible.

Figure 6:
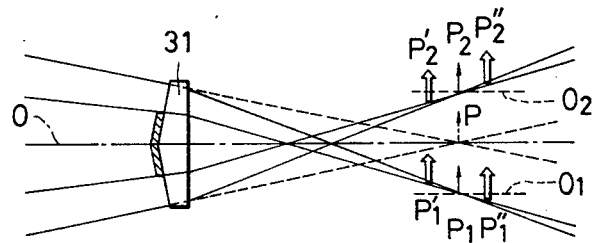
FIG. 6 is a view showing another basic optical system to which an image information processing device according to the present invention is to be applied.

FIG. 6 shows an optical system somewhat different from the optical system shown in FIG. 1. The reference numeral 31 denotes a prism provided near the pupil and performing the role corresponding to that of the light interrupting plate 2 in FIG. 1. According to this, the image at the time being in focus to be naturally formed in the position of P will be formed in the positions $P_1$ and $P_2$ and, at the time being out of focus, the image will be formed in the positions $P_1'$ and $P_2'$ or the positions $P_1''$ and $P_2''$. If these are considered on the basis of the optical axis $O_1$ and $O_2$ of the images in the positions $P_1$ and $p_2$ at the time being in focus, it will be found that the positions $P_1'$ and $p_2'$ or the positions $P_1''$ and $P_2''$ are displaced in the directions vertical respectively to the optical axes $O_1$ and $O_2$. That is to say, the principle is the same as of the optical system in FIG. 1. In the system in FIG. 1, the displacement of the image is observed as a vibration by the time division but, in the system in FIG. 6, the focusing may be considered to be observed in two places by the space division. Even in the system in FIG. 6, if the positions $P_1$ and $P_2$ of the images are close to each other, two images will be able to be picked up with one image sensor but the peripheral side of the image formed in the position $P_1$ will be likely to overlap the image in the position $P_2$ and therefore a field stop may be provided to be stopped in advance so that the visual field will not be overlapped. By the way, the time dividing system and space dividing system shall be compared with each other. The time dividing system has a merit that, as the images are formed in the same place, in case the images overlap, if they are focused, the criterion of judging focusing or nonfocusing will be easy to determine but has a demerit that such mechanically moving mechanism as a rotating light interrupting plate is required. The space dividing system has a merit that no mechanically moving mechanism is required but has a demerit that, as the images can not be formed in the same place, the criterion of judging focusing or nonfocusing will be difficult to determine.

Figure 7:
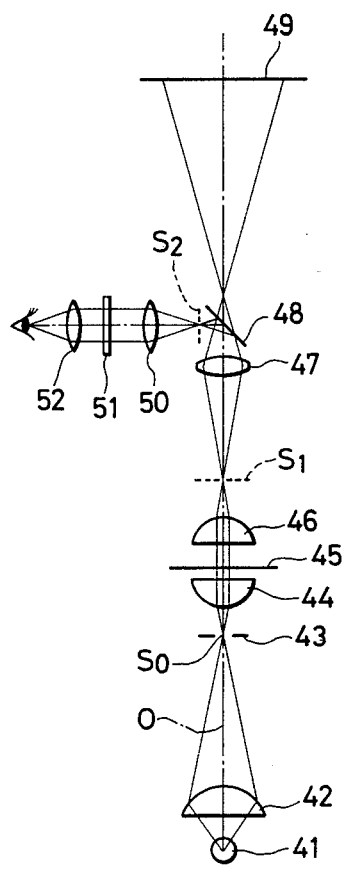
FIG. 7 is a view showing an optical system of a microscopic photographing device using the embodiment shown in FIG. 2.

FIG. 7 shows an optical system of a microscopic photographing device using a focusing device including the present device. The reference numeral 41 denotes a light source, 42 denotes a collector lens, 43 denotes an aperture stop of an illuminating system placed in the pupil position $S_0$ of the optical system, 44 denotes a condenser lens, 45 denotes a sample, 46 denotes an objective, 47 denotes an eyepiece, 48 denotes a beam splitter, 49 denotes a film surface, 50 denotes a relay lens, 51 denotes a focussing glass and 52 denotes a viewer. The light interrupting plate 2' shown in FIG. 3 is arranged near the place of any of the respective pupil positions $S_0$, $S_1$ and $S_2$. The optical system in FIG. 7 is so formed that observation can be made with the naked eye. Here, if the image sensor 3 is placed in the position of the focussing glass 51, a focusing device including the present device will be able to be used.

By the way, the image information processing device as described above can be applied not only to focusing but also to various uses. For example, in the case of spectroscopic measurement with two light bundles by using an image pickup device, the present invention can be used to remove unnecessary informations in the case of alternately putting in a standard light bundle and a sample light bundle by using a chopper or the like. Further, it can be used also in the case of making a VTR from a movie film. That is to say, the movie film has a black partition between picture frames. The data by it can be abandoned as unnecessary data in the case of moving from one picture frame to the other picture frame.

I claim:

1. An image information processing device comprising an image-forming optical system having a light interrupting plate with a plurality of transparent and opaque sections for forming an object image, an image pickup device arranged in a predetermined position apart from said image-forming optical system, a sample holding circuit connected to said image pickup device to sample and hold the output from said image pickup device, said object image including therein a substantially stationary state and a transitionary state, wherein said substantially stationary state occurs when light passes through said transparent sections of said plate, and said transitionary state occurs when light intersects said plate at a juncture of transparent and opaque sections, a detecting means for detecting the transitionary state of said object image, and a gate means for controlling the supply of a sampling signal to said sample holding circuit, said gate means being operated so that the sampling signal is not supplied to said sample holding circuit to thereby inhibit the sampling of the output signal from said image pickup device corresponding to the transitionary state of the object image and wherein said output signal occurs just after said detecting means has detected the transitionary state of the object image.

2. An image information processing device according to claim 1 further comprising a signal processing device connected to said sample holding circuit to supply the output from said sample holding circuit, and a gate controlling means connected to said gate means and capable of keeping said gate means in its operable state only when a read-in signal is supplied from said signal processing device to said gate controlling means.

* * * * *